United States Patent
Hagiwara et al.

(10) Patent No.: US 12,315,659 B2
(45) Date of Patent: May 27, 2025

(54) PERMANENT MAGNET, ROTARY ELECTRIC MACHINE, VEHICLE, AND AIRCRAFT

(71) Applicant: KABUSHIKI KAISHA TOSHIBA, Tokyo (JP)

(72) Inventors: Masaya Hagiwara, Yokohama (JP); Shinya Sakurada, Saitama (JP); Shogo Shintani, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 498 days.

(21) Appl. No.: 17/896,158

(22) Filed: Aug. 26, 2022

(65) Prior Publication Data

US 2023/0298786 A1 Sep. 21, 2023

(30) Foreign Application Priority Data

Mar. 18, 2022 (JP) .................. 2022-043698

(51) Int. Cl.
*H01F 1/055* (2006.01)
*C22C 19/07* (2006.01)
(Continued)

(52) U.S. Cl.
CPC ............ *H01F 1/055* (2013.01); *C22C 19/07* (2013.01); *C22C 30/02* (2013.01); *H02K 1/02* (2013.01);
(Continued)

(58) Field of Classification Search
CPC ....... H01F 1/055; H01F 1/0557; C22C 19/07; C22C 30/02; C22C 2202/02; H02K 1/02
See application file for complete search history.

(56) References Cited

U.S. PATENT DOCUMENTS

2013/0257209 A1 10/2013 Sakurada et al.
2017/0162304 A1 6/2017 Horiuchi et al.

FOREIGN PATENT DOCUMENTS

JP 2008-029148 A 2/2008
JP 2008-043172 A 2/2008
(Continued)

OTHER PUBLICATIONS

Japanese Office Action issued Nov. 26, 2024 in Japanese Patent Application No. 2022-043698 (with unedited computer-generated English translation), 6 pages.

*Primary Examiner* — Adil A. Siddiqui
(74) *Attorney, Agent, or Firm* — Oblon, McClelland, Maier & Neustadt, L.L.P.

(57) ABSTRACT

A permanent magnet to be provided to a rotary electric machine. The magnet is expressed by a composition formula: $R_p Fe_r M_s Cu_t Co_{100-p-r-s-t}$. R is selected from rare earth elements, M is selected from Ti, Zr, and Hf, p is a number satisfying $10.5 \leq p \leq 12.5$ at %, r is a number satisfying $18 \leq r \leq 32$ at %, s is a number satisfying $0.88 \leq s \leq 4.5$ at %, and t is a number satisfying $0.88 \leq t \leq 13.5$ at %. When a proportion $r_x$ of Fe to a total sum of Fe and Co is expressed by $r_x = r/(100-p-s-t)$, a value $r_1$ of the proportion $r_x$ at a center in a q-axis direction of the magnet and a value $r_2$ of the proportion $r_x$ at a center in d-axis direction of the magnet satisfy $1.01 \leq r_1/r_2 \leq 2$.

15 Claims, 5 Drawing Sheets

(51) Int. Cl.
*C22C 30/02* (2006.01)
*H02K 1/02* (2006.01)
(52) U.S. Cl.
CPC ........ *C22C 2202/02* (2013.01); *H01F 1/0557* (2013.01)

(56) References Cited

FOREIGN PATENT DOCUMENTS

| | | | |
|---|---|---|---|
| JP | 5586648 | B2 | 9/2014 |
| JP | 2015-73046 | A | 4/2015 |
| JP | 2019-122231 | A | 7/2019 |

PERMANENT MAGNET, ROTARY ELECTRIC MACHINE, VEHICLE, AND AIRCRAFT

CROSS REFERENCE TO RELATED APPLICATION

This application is based upon and claims the benefit of priority from Japanese Patent Application No. 2022-043698, filed on Mar. 18, 2022; the entire contents of which are incorporated herein by reference.

FIELD

Embodiments relate to a permanent magnet, a rotary electric machine, a vehicle, and an aircraft.

BACKGROUND

Permanent magnets are used in products in a wide range of fields including, for example, rotary electric machines such as a motor, a power generator and the like, electric devices such as a speaker, a measuring device, and the like, and vehicles such as an automobile, a railway vehicle, and the like. In particular, electrification of various movable bodies such as an automobile, an aircraft, a ship and a vessel, and the like is underway in recent years, and drive motors used therein are required to have reduced size and weight and have high output. When achieving the reduction in size and weight while keeping the high output, the heating density increases to cause the temperature of the motor likely to rise. In particular, when the permanent magnet reaches high temperature, thermal demagnetization occurs, resulting in a decrease in motor output. A liquid cooling system using a liquid refrigerant is often used for enhancing the cooling capacity, but the weight of the whole system increases due to the formation of a refrigerant flow path, an increase in size of a heat exchanger, or the like. Hence, to achieve both the reduction in size and weight and the high output of the motor, it is required to enhance the heat resistance of the permanent magnet and prevent the thermal demagnetization.

As an example of a high-performance permanent magnet, rare-earth magnets such as a Sm—Co-based magnet, a Nd—Fe—B-based magnet, and so on are known. For example, a permanent magnet is used which is enhanced in heat resistance by substituting a part of Nd of the Nd—Fe—B-based magnet with Dy. Since Dy is one of the scarce elements, a permanent magnet not using Dy is required. It is known that the Sm—Co-based magnet is high in Curie temperature and thus exhibits excellent heat resistance in a system not using Dy. The Sm—Co-based magnet is attracting attention as a permanent magnet capable of realizing good motor characteristics and so on under high temperature.

To enhance the output of the motor, it is effective to increase the magnetic flux density of the permanent magnet. To increase the magnetic flux density in the Sm—Co-based magnet, it is effective to substitute a part of Co with Fe and increase the Fe concentration. However, the permanent magnet has a disadvantage that the coercive force at high temperature being an index of the heat resistance becomes smaller and thermal demagnetization is more likely to occur in a composition region where the Fe concentration is high. Therefore, a permanent magnet achieving both a high magnetic flux density and high heat resistance is required. The thermal demagnetization is likely to occur at a high temperature of 200° C. or higher.

DETAILED DESCRIPTION

Figure 1:
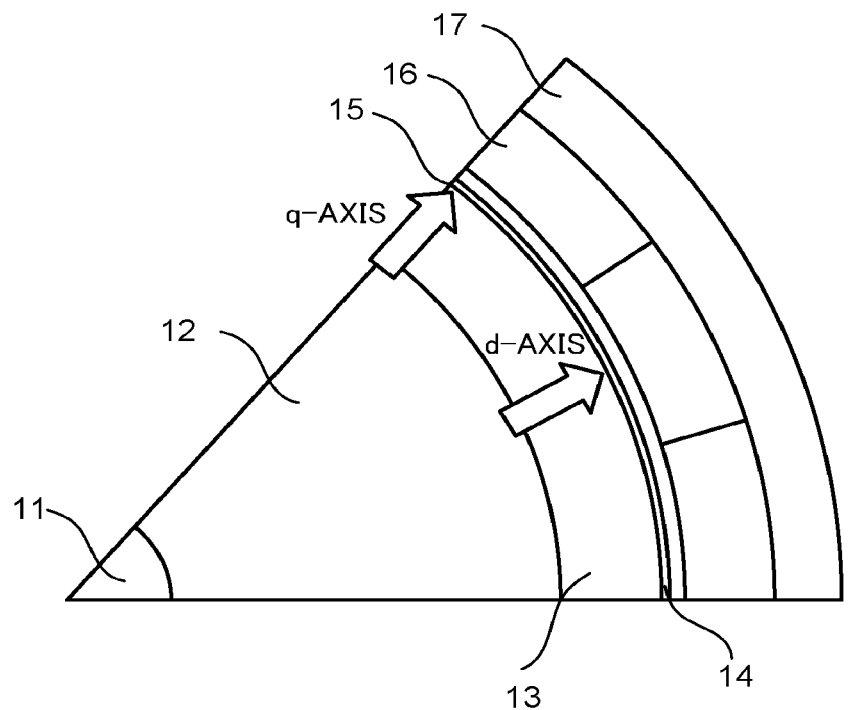
FIG. 1 is a schematic view illustrating a part of a surface magnet type rotary electric machine.

A permanent magnet to be provided to a rotary electric machine. The magnet is expressed by a composition formula: $R_p Fe_r M_s Cu_t Co_{100-p-r-s-t}$. R is at least one element selected from the group consisting of rare earth elements, M is at least one element selected from the group consisting of Ti, Zr, and Hf, p is a number satisfying $10.5 \le p \le 12.5$ at %, r is a number satisfying $18 \le r \le 32$ at %, s is a number satisfying $0.88 \le s \le 4.5$ at %, and t is a number satisfying $0.88 \le t \le 13.5$ at %. When a proportion $r_x$ of Fe to a total sum of Fe and Co is expressed by $r_x = r/(100-p-s-t)$, a value $r_1$ of the proportion $r_x$ at a center in a q-axis direction of the magnet and a value $r_2$ of the proportion $r_x$ at a center in d-axis direction of the magnet satisfy $1.01 \le r_1/r_2 \le 2$.

Hereinafter, embodiments will be explained with reference to the drawings. Note that the drawings are schematically illustrated, in which, for example, the relation between a thickness and plane dimensions, and a ratio between thicknesses of layers may differ from actual ones. In the embodiments, the same reference numerals are given to substantially the same components to omit redundant explanation.

First Embodiment

A permanent magnet of an embodiment comprises a composition expressed by a composition formula: $R_p Fe_r M_s Cu_t Co_{100-p-r-s-t}$. In the formula, R is at least one element selected from the group consisting of rare earth elements, M is at least one element selected from the group consisting of Ti, Zr, and Hf, p is a number satisfying $10.5 \le p \le 12.5$ at %, r is a number satisfying $18 \le r \le 32$ at %, s is a number satisfying $0.88 \le s \le 4.5$ at %, and t is a number satisfying $0.88 \le t \le 13.5$ at %.

The R element provides large magnetic anisotropy and applies high coercive force to the permanent magnet. As the R element, one or more rare earth elements are used. It is more preferable to use, as the R element, at least one element selected from yttrium (Y), samarium (Sm), cerium (Ce), neodymium (Nd), and praseodymium (Pr), and it is especially preferable to use Sm. By setting 50 at % or more of the R element to Sm, the performance of the magnet material, especially, the coercive force can be enhanced with good repeatability. Further, it is more preferable that 70 at % or more of the R element is Sm, and furthermore preferable that 90 at % or more of the R element is Sm.

The content of the R element is, for example, 10.5 at % or more and 12.5 at % or less. When the content of the R element is less than 10.5 at %, a large amount of α-Fe phase precipitates and sufficient coercive force cannot be obtained. On the other hand, when the content of the R element is more than 12.5 at %, the saturation magnetization significantly deteriorates. The content of the R element is preferably 10.9 at % or more and 12.0 at % or less, and more preferably 11.0 at % or more and 11.6 at % or less.

The M element is at least one element selected from titanium (Ti), zirconium (Zr), and hafnium (Hf). By compounding the M element, high coercive force can be developed by a composition with high Fe concentration. The content of the M element is, for example, 0.88 at % or more and 4.5 at % or less. When the content of the M element is less than 0.88 at %, the effect of increasing the Fe concentration is low, whereas when the content of the M element is more than 4.5 at %, a phase excessively containing the M element is generated to make the magnetic property more likely to deteriorate. The content of the M element is 1.0 at % or more and 3.5 at % or less, more preferably 1.2 at % or more and 2.5 at % or less, and furthermore preferably 1.3 at % or more and 2.0 at % or less.

The M element may be any of Ti, Zr, Hf, and preferably contains at least Zr. In particular, by setting 50 at % or more of the M element to Zr, the effect of enhancing the coercive force of the permanent magnet can be further improved. On the other hand, Hf in the M element is especially expensive, and therefore it is preferable to use a smaller amount of Hf even if Hf is used. It is preferable that the content of Hf is less than 20 at % of the M element.

Copper (Cu) can develop high coercive force in the magnet material. The content of Cu is, for example, 0.88 at % or more and 13.5 at % or less. Since Cu is a nonmagnetic element, the magnetization significantly deteriorates in the case of more than 13.5 at %. In the case of less than 0.88 at %, it becomes difficult to obtain high coercive force. The content of Cu is preferably 1.5 at % or more and 10.0 at % or less, more preferably 3.0 at % or more and 9.0 at % or less, more preferably 3.5 at % or more and 8.0 at % or less, more preferably 3.9 at % or more and 8.0 at % or less, and furthermore preferably 4.3 at % or more and 5.8 at % or less.

Iron (Fe) is mainly responsible for magnetization of the permanent magnet. By containing a large amount of Fe, the permanent magnet can be enhanced in saturation magnetization. However, when the content of Fe is excessive, the coercive force deteriorates due to the precipitation of the α-Fe phase or the like. The content of Fe is, for example, 18 at % or more and 32 at % or less. The content of Fe is preferably 20 at % or more and 31 at % or less, more preferably 22 at % or more and 30 at % or less, and furthermore preferably 23 at % or more and 28 at % or less.

Cobalt (Co) is an element that is responsible for magnetization of the permanent magnet and is required to develop high coercive force. Further, when a large amount Co is contained, the Curie temperature increases and thermal stability of the permanent magnet also improves. When the compounding amount of Co is small, these effects decrease. However, when Co is excessively contained in the permanent magnet, the content of Fe relatively reduces, possibly resulting in deterioration of magnetization. The content of Co is in a range specified by p, r, s, t (100−p−r−s−t).

A part of Co may be substituted with at least one element A selected from nickel (Ni), vanadium (V), chromium (Cr), manganese (Mn), aluminum (Al), silicon (S), gallium (Ga), niobium (Nb), tantalum (Ta), and tungsten (W). The substitution elements contribute to improvement in the magnet characteristics, for example, the coercive force. However, excessive substitution of Co with the element A may cause deterioration in magnetization, and therefore the amount of substitution with the element A is set to a range of 20 at % or less of Co.

The composition of the permanent magnet is measured, for example, by a high-frequency inductively coupled plasma (ICP) emission spectrochemical analysis method, a SEM-energy dispersive X-ray spectroscopy (SEM-EDX), a transmission electron microscope-EDX (TEM-EDX) or the like. Here, the composition of the permanent magnet means an average composition of one whole permanent magnet.

When a proportion $r_x$ of Fe to the total sum of Fe and Co is expressed by $r_x=r/(100-p-s-t)$ and in the case where a value of $r_x$ at a q-axis direction center of the permanent magnet is $r_1$ and a value of $r_x$ at a d-axis direction center of the permanent magnet is $r_2$, $1.01 \leq r_1/r_2 \leq 2$ in the form of the permanent magnet provided to the rotary electric machine. Here, the d-axis direction of the permanent magnet is a direction of a field magnetic flux by the permanent magnet, and the q-axis direction is a direction advanced by π/2 in electric angle from the d-axis.

FIG. 1 is a schematic view illustrating a part of a surface magnet type rotary electric machine having a rotor therein. The rotary electric machine illustrated in FIG. 1 has a rotor core 12 arranged concentrically with a rotation shaft 11, a permanent magnet 13 and a fixation member 14 arranged outside the rotor core 12, and a coil 16 and a stator core 17 arranged outside the fixation member 14 with a gap layer 15 intervening therebetween. The d-axis and the q-axis are schematically illustrated in FIG. 1. For example, when the appearance of thermal demagnetization of the permanent magnet in the form provided to the rotary electric machine is analyzed by the electromagnetic analysis or the like, it is found that there are a region where the thermal demagnetization is likely to occur and a region where the thermal demagnetization is unlikely to occur. The rotary electric machine illustrated in FIG. 1 easily leads to the thermal demagnetization more in the d-axis direction than in the q-axis direction. In the rotary electric machine, the prevention of the thermal demagnetization of the permanent magnet is effective to preferentially enhance the heat resistance of the region where the rotary electric machine easily leads to the thermal demagnetization.

Figure 2:
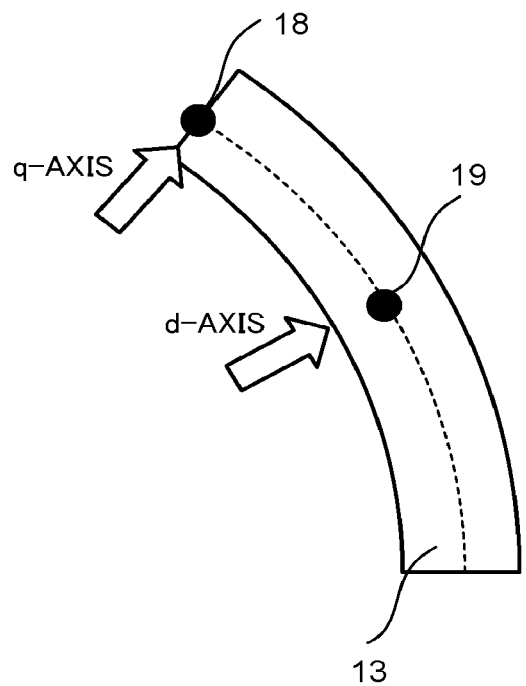
FIG. 2 is a schematic view illustrating a permanent magnet 13 in FIG. 1.

By controlling the concentration distribution of the Fe element in the permanent magnet in accordance with the d-axis direction and the q-axis direction, it is possible to effectively prevent the thermal demagnetization while keeping the high magnetic flux density. In other words, in the permanent magnet in this embodiment, when a distribution of the Fe concentration spatially exists in a macro scale and the proportion $r_x$ of Fe to the total sum of Fe and Co is expressed by $r_x=r/(100-p-s-t)$, the value of $r_x$ in the q-axis direction is larger than the value of $r_x$ in the d-axis direction. Further, in the case where the value of $r_x$ at the center in the q-axis direction of the permanent magnet, which is also called "q-axis direction center", is $r_1$ and the value of $r_x$ at the center in the d-axis direction center of the permanent magnet, which is also called "d-axis direction center", is $r_2$, $r_1/r_2$ that is a ratio of $r_1$ to $r_2$ satisfies $1.01 \leq r_1/r_2 \leq 2$. Here, the q-axis direction center and the d-axis direction center are intersections between a middle line in a magnetization direction and the q-axis and the d-axis respectively in a cross-section of the permanent magnet cut parallel to the magnetization direction. In the case of an arc-shaped magnet illustrated in FIG. 1, they are intersections with the q-axis and the d-axis with the center arc located at equal distances from an arc of an inner circumference and an arc of an outer circumference, respectively. FIG. 2 illustrates a q-axis direction center 18 and a d-axis direction center 19. FIG. 2 is a schematic view illustrating the permanent magnet 13 in FIG. 1.

An example of the measuring method using SEM-EDX will be illustrated. Following the above procedure, the q-axis direction center and the d-axis direction center are specified in the cross-section of the permanent magnet to be measured. Next, a cross-sectional length x in the magnetization direction is measured. In the case of the arc shape, the cross-sectional length x in the magnetization direction is the distance between the arc of the inner circumference and the arc of the outer circumference. Next, circles having a diameter of x/4 or more and x/3 or less are drawn around the q-axis direction center and the d-axis direction center. Next, two straight lines orthogonal to each other are drawn in each of the circles, and each of the straight lines is divided into five or more equal parts. At each of division points, SEM-EDX analysis is performed at about 1000 magnifications to measure an average composition of the entire field of view. Next, its average value is determined for each of the circles, and regarded as each of the compositions at the q-axis direction center and the d-axis direction center.

When the value $r_1$ and the value $r_2$ are equal, the heat resistance of the permanent magnet is equivalent in the q-axis direction and the d-axis direction, and therefore the heat resistance of the whole permanent magnet needs to be enhanced in order to prevent the thermal demagnetization. This case causes a decrease in magnetic flux density of the permanent magnet. Alternatively, when $r_1$ is smaller than $r_2$, the heat resistance deteriorates in the d-axis direction where the thermal demagnetization is likely to occur, causing the thermal demagnetization. $r_1/r_2$ is preferably 1.01 or more, more preferably 1.05 or more, furthermore preferably 1.10 or more, and moreover preferably 1.15 or more. On the other hand, when $r_1/r_2$ is larger than 2, the spatial distribution of the magnetic flux density becomes large and the field magnetic flux of the permanent magnet becomes spatially nonuniform, resulting in a decrease in efficiency of the rotary electric machine. $r_1/r_2$ is preferably 2 or less, more preferably 1.5 or less, and furthermore preferably 1.3 or less. Setting $r_1/r_2$ to the above range makes it possible to bring the demagnetizing factor in the d-axis direction to 10% or less while keeping the high magnetic flux density.

In the case of mounting the permanent magnet in the rotary electric machine, one magnet having the spatial concentration distribution of Fe as above may be bonded. For example, bonding the magnet in a direction parallel to the rotation shaft 11 in FIG. 1 can prevent the eddy current loss occurring in the magnet. Further, a plurality of magnets different in Fe concentration can be bonded together to form the concentration distribution of Fe as above, but an inverse domain may become more likely to occur on the bonding surface of the magnets and may cause the thermal demagnetization. The formation of the Fe concentration distribution by one magnet is preferable because it is possible to prevent the occurrence of the inverse domain and obtain a uniform field magnetic flux.

The permanent magnet in this embodiment preferably includes a $TbCu_7$ crystal phase (crystal phase having a $TbCu_7$ structure/1-7 phase) as a high-temperature phase which serves as a precursor, and a phase separation structure formed by applying an aging treatment or the like on the $TbCu_7$ crystal phase, namely, a metal structure (cell structure) having a cell phase composed of a $Th_2Zn_{17}$ crystal phase (crystal phase having a $Th_2Zn_{17}$ structure/2-17 phase) and a cell wall phase formed in a manner to surround the cell phase and composed of a $CaCu_5$ crystal phase (crystal phase having a $CaCu_5$ structure/1-5 phase). Note that the metal structure of the permanent magnet may contain a crystal phase other than the cell phase composed of the 2-17 phase and the cell wall phase composed of the 1-5 phase, and an amorphous phase.

The magnetic domain wall energy of the 1-5 phase (cell wall phase) precipitated at a grain boundary of the 2-17 phase (cell phase) is larger than the magnetic domain wall energy of the 2-17 phase, and the difference between the magnetic domain wall energies becomes a barrier of the magnetic domain wall displacement. It can be considered that, for example, in a $Sm_2Co_{17}$ type magnet, the 1-5 phase or the like large in magnetic domain wall energy serves as a pinning site to develop the magnetic domain wall pinning type coercive force. Here, it can be considered that the difference in magnetic domain wall energy mainly occurs from the difference in concentration of Cu. When the Cu concentration in the cell wall phase is higher than the Cu concentration in the cell phase, the coercive force is developed. Therefore, it is preferable that the cell wall phase has a Cu concentration equal to or more than 1.2 times the Cu concentration of the cell phase. This makes it possible to cause the cell wall phase sufficiently serve as a pinning site of the magnetic domain wall and obtain sufficient coercive force.

A representative example of the cell wall phase existing in a manner to surround the cell phase is, but not necessarily limited to, the above 1-5 phase. When the cell wall phase has a Cu concentration equal to or more than 1.2 times the Cu concentration of the cell phase, the cell wall phase can be made to sufficiently serve as the pinning site of the magnetic domain wall, thereby making it possible to obtain high coercive force. Accordingly, the cell wall phase only needs to be a Cu-rich phase as explained above. Examples of the cell wall phase other than the 1-5 phase include the 1-7 phase being a high-temperature phase (structure before the phase separation), a precursor phase of the 1-5 phase generated at an initial stage of the phase separation of the 1-7 phase, and so on.

The embodiment of the permanent magnet in the embodiment is not limited but is preferably a sintered magnet. The permanent magnet in the embodiment includes a sintered compact having a two-dimensional metal structure including a plurality of crystal grains constituting a main phase and a crystal grain boundary (also referred to as a grain boundary phase) of the crystal grain. The main phase is defined by a phase having a maximum volume ratio of all constituent phases. The percentage of the main phase is preferably 70 vol % or more and more preferably 90 vol % or more of all constituent phases. In the crystal grain, the permanent magnet has the above cell structure. A c-axis of the 2-17 phase preferably exists parallel or almost parallel to the easy magnetization axis. Almost parallel includes a direction displaced by −10 degrees or more and +10 degrees or less from the parallel direction.

The volume ratios of the phases of the metal structure are comprehensively determined, for example, using both the observations under an electron microscope or an optical microscope and the X-ray diffraction or the like in combination. The volume ratios can be found by an areal analysis method using an electron micrograph obtained by photographing a cross-section of the permanent magnet. As the cross-section of the permanent magnet, a cross-section of a substantially center part of a surface having the maximum surface area of the specimen is used.

Next, an example of a method of manufacturing the permanent magnet will be explained. First, an alloy powder containing predetermined elements necessary to compose a permanent magnet is prepared. The alloy powder can be prepared, for example, by pulverizing an alloy ingot obtained by casting a molten metal prepared by an arc melting method or a high frequency melting method. The alloy powder may be prepared to have a desired composition by mixing a plurality of powders different in composition. A plurality of kinds of alloy powders different in Fe concentration are prepared.

Other methods of preparing the alloy powder include a mechanical alloying method, a mechanical grinding method, a gas atomizing method, a reduction diffusion method and the like. The use of the strip cast method can improve the uniformity of the alloy powder. Further, a heat treatment performed on the alloy powder or an alloy material before pulverization can homogenize the material. For example, a jet mill or a ball mill can be used to pulverize the material. Note that pulverizing the material in an inert gas atmosphere or an organic solvent can prevent oxidation of the powder.

The average grain diameter of the powder after pulverization is preferably 1 μm or more and 10 μm or less. The average grain diameter of the powder after pulverization is more preferably 3 μm or more and 8 μm or less, and furthermore preferably 4 μm or more and 7 μm or less. By setting the percentage of a grain having a grain diameter of 1 μm or less to 1 vol % or less, an oxide amount can be prevented. By setting the percentage of a grain having a grain diameter of 10 μm or more to 2 vol % or less, the porosity of the sintered compact produced after sintering is reduced and sufficient density can be realized.

The average grain diameter of the powder is defined by the value of a grain diameter (median diameter: d50) where the cumulative distribution becomes 50% in a grain size distribution measured by a laser diffraction method or the like. For the production of the powder, the use of a jet mill is suitable.

Next, the alloy powder is filled into a metal mold installed in an electromagnet, and subjected to pressure forming while a magnetic field is being applied thereon to manufacture a green compact with an oriented crystallographic axis. In this event, the alloy powder different in Fe concentration between the q-axis direction and the d-axis direction is filled so that the region in the d-axis direction and the region in the q-axis direction are specified when the permanent magnet is provided to the rotary electric machine and $r_1/r_2$ becomes a desired value. The composition of the powder to be filled in a region between the region in the d-axis direction and the region in the q-axis direction may be adjusted to have an intermediate Fe concentration or may be adjusted so that the Fe concentration continuously changes. Examples of a molding method include a dry molding method and a wet molding method. For the dry molding method, a trace of a lubricant is preferably added for improvement in flowability of the power and oxidation prevention. Examples of the lubricant include a silicone oil, a mineral oil, and the like.

Next, the sintering is performed on the green compact by a heat treatment at 1180° C. or higher and 1250° C. or lower for 0.5 hours or more and 15 hours or less. When the heat treatment temperature is lower than 1180° C., the density of the sintered compact is insufficient. When the heat treatment temperature is higher than 1250° C., the magnetic property may deteriorate due to excessive evaporation of the R element such as Sm in the powder. The heat treatment temperature is preferably, for example, 1180° C. or higher and 1220° C. or lower, and more preferably 1190° C. or higher and 1210° C. or lower.

When the heat treatment time is less than 0.5 hours, sufficient density may not be obtained. When the heat treatment time is more than 15 hours, the evaporation of the R element in the powder becomes excessive, and the magnetic property possibly deteriorates. The heat treatment time is preferably 1 hour or more and 10 hours or less, and more preferably 1 hour or more and 7 hours or less. To prevent oxidation in the above sintering, it is preferable to perform the heat treatment in a vacuum, an inert atmosphere such as an argon gas, or the like.

To the obtained sintered compact, a solution heat treatment is performed and rapid cooling is performed after the heat treatment. Performing the solution heat treatment can make the $TbCu_7$ crystal phase (1-7 phase) being the precursor phase into a single phase. The heat treatment is preferably performed in a vacuum, an inert atmosphere such as an argon gas, or the like. The temperature of the solution heat treatment is preferably 1100° C. or higher and 1210° C. or lower. When the temperature of the solution heat treatment is lower than 1100° C. or higher than 1210° C., the formation of the precursor is insufficient, and the magnetic property may deteriorate. The temperature of the solution heat treatment is more preferably, for example, 1120° C. or higher, and furthermore preferably 1150° C. or higher. Further, the temperature is more preferably 1200° C. or lower, and furthermore preferably 1190° C. or lower.

The time of the solution heat treatment is preferably 4 hours or more and 50 hours or less. When the time of the solution heat treatment is less than 4 hours, the element diffusion is insufficient, the constituent phase is likely to become non-uniform, and the magnetic property may deteriorate. When the time of the solution heat treatment is more than 50 hours, the R element in the sintered compact may evaporate and the productivity decreases. The time of the solution heat treatment is more preferably 4 hours or more and 30 hours or less.

A quality improvement heat treatment may be performed before the solution heat treatment. A heat treatment is performed, for example, by holding the sintered compact at a temperature lower by 10° C. or more than the heat treatment temperature during the sintering and a temperature higher by 10° C. or more than the heat treatment temperature during the solution heat treatment for 4 hours or more and 30 hours or less. Performing the quality improvement heat treatment causes, for example, coarsening and homogenization of the crystal grain to improve the squareness of the magnetic property.

The temperature of the quality improvement heat treatment is preferably 1130° C. or higher and 1210° C. or lower. When the temperature is higher than the heat treatment temperature during the sintering, a hetero-phase caused from the liquid phase may be produced to deteriorate the magnetic property and cause evaporation of the R element. When the temperature of the quality improvement heat treatment is too low, the progress of diffusion is insufficient to fail to obtain effects.

Performing the rapid cooling down to room temperature after the solution heat treatment can stabilize the $TbCu_7$ crystal phase, thus easily developing the coercive force. When the cooling rate is low, the $Ce_2Ni_7$ crystal phase and the $Th_2Zn_{17}$ crystal phase are likely to be produced during the cooling.

Next, an aging treatment is applied to the sintered compact after the solution heat treatment to form a phase separation region. In the aging treatment, the sintered compact is preferably subjected to a heat treatment at a temperature of 700° C. or higher and 900° C. or lower for 10 hours or more and 100 hours or less, then subjected to slow cooling down to a temperature of 20° C. or higher and 600° C. or lower at a cooling rate of 0.1° C/min or more and 5° C./min or less, and then cooled down to room temperature (for example, 25° C.). Performing the aging treatment under the above conditions enables improvement in coercive force and so on of the permanent magnet having the phase separation structure. The aging treatment is preferably performed in a vacuum, an inert gas atmosphere such as an argon gas, or the like for oxidation prevention.

When the temperature of the aging treatment is lower than 700° C. or higher than 900° C., a uniform mixed structure of the cell phase and the cell wall phase cannot be obtained, and the magnetic property of the permanent magnet may deteriorate. The temperature of the aging treatment is preferably 750° C. or higher and 880° C. or lower, and more preferably 780° C. or higher and 850° C. or lower.

When the time of the aging treatment is less than 10 hours, the cell wall phase is not sufficiently produced or the element diffusion may be insufficient. On the other hand, when the holding time is more than 100 hours, the cell wall phase becomes thick to decrease the volume fraction of the cell phase, and excellent magnet characteristics may not be obtained. The aging treatment time is more preferably 10 hours or more and 90 hours or less, and furthermore preferably 20 hours or more and 80 hours or less.

When the cooling rate during the slow cooling is less than 0.1° C./min, the productivity may decrease to increase the cost. When the cooling rate during the slow cooling is more than 5° C./min, the uniform mixed structure of the cell phase and the cell wall phase cannot be obtained, and the magnetic property of the permanent magnet may deteriorate. The cooling rate after the aging treatment is preferably 0.3° C./min or more and 4° C./min or less, and more preferably 0.5° C./min or more and 3° C./min or less.

A preliminary aging treatment of performing a heat treatment at a temperature lower than the aging treatment temperature may be performed before the above aging treatment. In the preliminary aging treatment, it is preferable to perform the heat treatment at a temperature of 500° C. or higher and 900° C. or lower for 0.5 hours or more and 10 hours or less and then perform slow cooling down to a temperature of 20° C. or higher and 450° C. or lower at a cooling rate of 0.1° C./min or more and 5° C./min or less. Performing the preliminary aging treatment can improve the squareness of the magnetic property.

Second Embodiment

The permanent magnet in the first embodiment can be used for rotary electric machines such as various motors and power generators provided in an automobile, a railway vehicle, an aircraft, and the like. Further, the permanent magnet can also be used as a stationary magnet and a variable magnet of a variable magnetic flux motor and a variable magnetic flux power generator. By using the permanent magnet in the first embodiment, various motor and power generators are constituted. In the case of applying the permanent magnet in the first embodiment to the variable magnetic flux motor, the techniques disclosed, for example, in Japanese Laid-open Patent Application No. 2008-29148 and Japanese Laid-open Patent Application No. 2008-43172 are applicable to the configuration and the drive system of the variable magnetic flux motor.

[A] Permanent Magnet Motor

Figure 3:
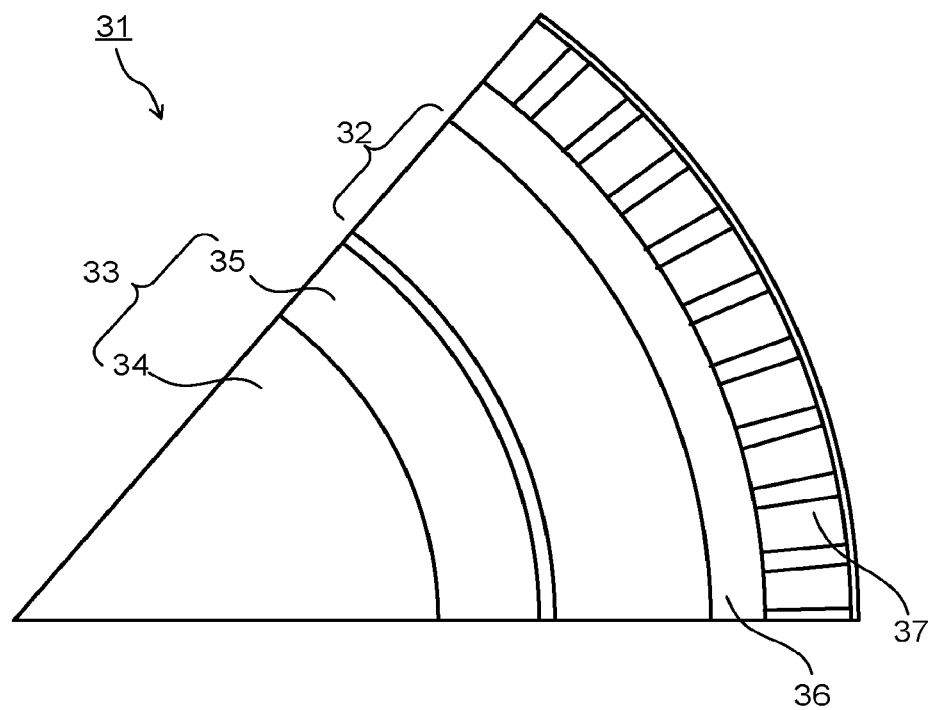
FIG. 3 is a schematic view illustrating a part of a permanent magnet motor cross-section.

FIG. 3 is a schematic view illustrating a part of a permanent magnet motor cross-section in this embodiment. A permanent magnet motor 31 illustrated in FIG. 3 has a rotor 33 arranged in a stator 32. On a surface of an iron core 34 of the rotor 33, a permanent magnet 35 being the permanent magnet in the first embodiment is arranged. Outside the stator 32, a casing 36 and a cooling fin 37 are arranged. The use of the permanent magnet in the first embodiment enhances the heat resistance of the permanent magnet, and the employment of the air cooling system can achieve the reduction in size and weight and so on of the motor system.

[B] Power Generator

Figure 4:
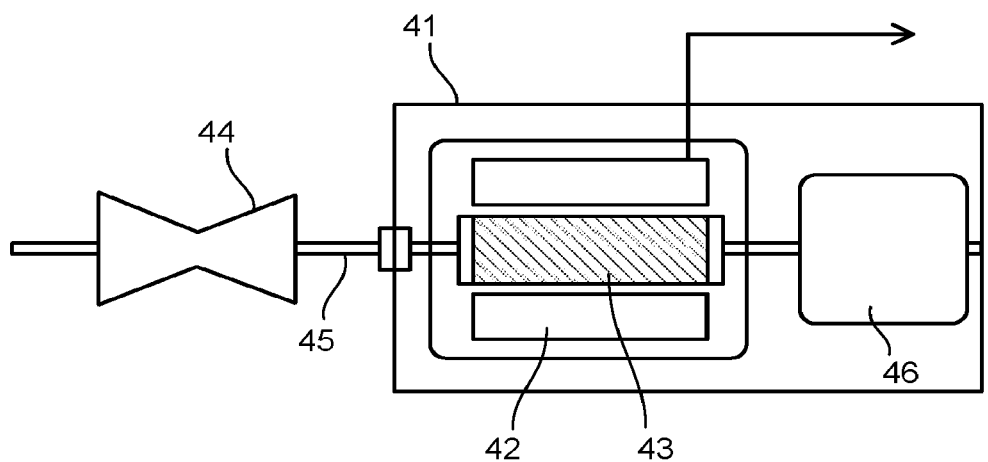
FIG. 4 is a schematic view illustrating a power generator.

FIG. 4 is a schematic view illustrating a power generator according to this embodiment. A power generator 41 illustrated in FIG. 4 includes a stator 42 using the above permanent magnet. A rotor 43 arranged inside the stator 42 is connected to a turbine 44 provided at one end of the power generator 41 via a shaft 45. The turbine 44 rotates, for example, by fluid supplied from the external part. Note that in place of the turbine 44 rotating by the fluid, transmitting dynamic rotation of regenerative energy or the like of a vehicle such as an automobile can also rotate the shaft 45. For the stator 42 and the rotor 43, various publicly-known configurations can be employed, The shaft 45 is in contact with a commutator (not illustrated) arranged on the side opposite to the turbine 44 with respect to the rotor 43, so that an electromotive force generated by the rotation of the rotor 43 is boosted to a system voltage and is transmitted as an output from the power generator 41, via an isolated-phase bus and a main transformer (not illustrated). The power generator 41 may be any of an ordinary power generator and a variable magnetic flux generator. Note that charge by static electricity from the turbine 44 and an axis current accompanying power generation occurs on the rotor 43. Therefore, the power generator 41 includes a brush 46 for discharging the charge of the rotor 43.

As explained above, applying the above permanent magnet to the power generator brings about the effects such as high efficiency, size reduction, cost reduction, and so on.

[C] Railway Vehicle

Figure 5:
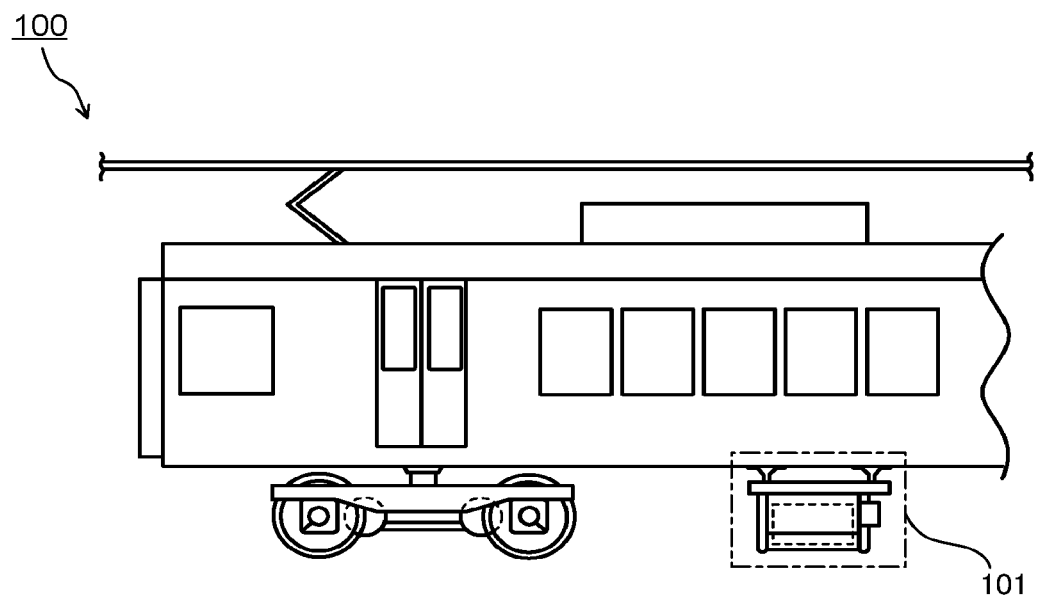
FIG. 5 is a schematic view illustrating an example of a railway vehicle.

The above rotary electric machine may be mounted, for example, in a railway vehicle (an example of a vehicle) used for railway traffic. FIG. 5 is a schematic view illustrating an example of a railway vehicle 100 including a rotary electric machine 101. As the rotary electric machine 101, the motor in FIG. 3, the power generator in FIG. 4, or the like can be used. In the case where the above rotary electric machine is mounted as the rotary electric machine 101, the rotary electric machine 101 may be used, for example, as an electric motor (motor) which outputs a driving force by utilizing power supplied from an overhead wire or power supplied from a secondary battery provided to the railway vehicle 100, or may be used as a power generator (generator) which converts kinetic energy to power and supplies the power to various loads in the railway vehicle 100. The use of the high-efficiency rotary electric machine such as the rotary electric machine in the embodiment can make the railway vehicle run with saved energy.

[D] Automobile

Figure 6:
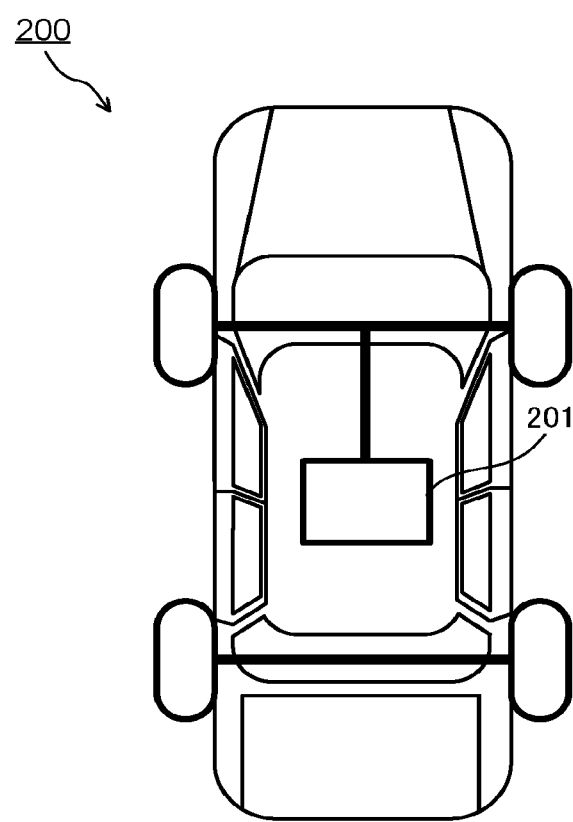
FIG. 6 is a schematic view illustrating an example of an automobile.

The above rotary electric machine may be provided to an automobile (another example of the vehicle) such as a hybrid electric vehicle, an electric vehicle, or the like. FIG. 6 is a schematic view illustrating an example of an automobile 200 including a rotary electric machine 201. As the rotary electric machine 201, the motor in FIG. 3, the power generator in FIG. 4, or the like can be used. In the case where the above rotary electric machine is mounted as the rotary electric machine 201, the rotary electric machine 201 may be used as an electric motor which outputs a driving force of the automobile 200 or a power generator which converts kinetic energy during running of the automobile 200 to power.

[E] Aircraft

Figure 7:
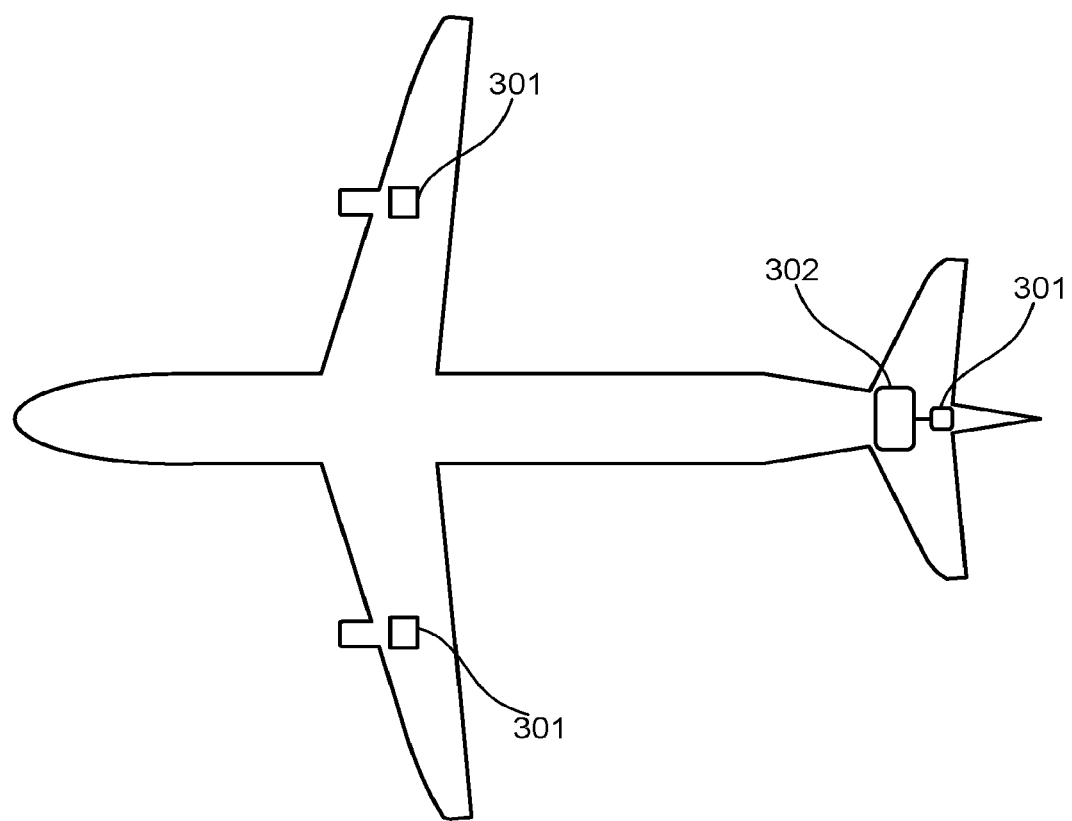
FIG. 7 is a schematic view illustrating an example of an aircraft.

The above rotary electric machine may be provided to an aircraft. FIG. 7 is a schematic view illustrating an example of an aircraft 300 including a rotary electric machine 301. A fan 302 is driven by the rotary electric machine 301 arranged at a fuselage tail-section to raise the flow rate of the gas flowing to the rearward of the fuselage, thereby increasing the propulsion efficiency of the aircraft. For the rotary electric machine 301 for driving the fan, the above motor in FIG. 3 can be used. Further, as the rotary electric machine 301 for supplying power to the motor, the above power generator in FIG. 4 can be used. Further, the above motor in FIG. 3 may be used in place of the engine. Further, the above rotary electric machine may be mounted, for example, in an industrial apparatus (industrial motor), an air-conditioning apparatus (air-conditioner, water heater compressor motor), a wind power generator, or an elevator (hoisting machine).

EXAMPLES

Examples 1, 2

Raw materials were weighed at a prescribed ratio and subjected to high-frequency melting to produce an alloy ingot. The alloy ingot was coarsely ground and then finely ground by a jet mill to prepare a first alloy powder having an average grain diameter of 4 µm. Further, a second alloy powder lower in Fe concentration than the first alloy powder and having an average grain diameter of 4 µm was similarly prepared.

In filling the obtained alloy powders into the metal mold, the first alloy powder and the second alloy powder were placed so that the first alloy powder was arranged in the region in the q-axis direction and the second alloy powder was arranged in the region in the d-axis direction. Subsequently, the filled alloy powders were pressed at a press pressure of 1 t (1000 kg) while a magnetic field of 1 T was being applied thereto to form a green compact.

The obtained green compact was subjected to sintering. In the sintering, the temperature of the green compact was raised up to a temperature of 1210° C. in an Ar atmosphere and held for 3 hours.

Next, the sintered compact was held at a temperature of 1190° C. for 4 hours in the Ar atmosphere and thereby subjected to a quality improvement heat treatment, then held at a temperature of 1170° C. for 12 hours and thereby subjected to a solution heat treatment, and then subjected to gas cooling down to room temperature.

Next, the sintered compact after the solution heat treatment was subjected to a heat treatment at a temperature of 830° C. for 40 hours in the Ar atmosphere, then subjected to slow cooling down to a temperature of 300° C. at a cooling rate of 0.3° C./min, and further cooled down to room temperature, as the aging treatment. Through the above processes, a sintered magnet was obtained.

Examples 3, 4

Raw materials were weighed at a prescribed ratio and subjected to high-frequency melting to produce an alloy ingot. The alloy ingot was coarsely ground and then finely ground by a jet mill to prepare a first alloy powder having an average grain diameter of 4 µm. Further, a second alloy powder lower in Fe concentration than the first alloy powder and having an average grain diameter of 4 µm was similarly prepared, and a third alloy powder having an average grain diameter of 4 µm was prepared similarly to the first alloy powder and the second alloy powder so as to have a composition having a Fe concentration between those of the first alloy powder and the second alloy powder.

In filling the obtained alloy powders into the metal mold, the first alloy powder, the second alloy powder, and the third alloy powder were placed so that the first alloy powder was arranged in the region in the q-axis direction, the second alloy powder was arranged in the region in the d-axis direction, and the third alloy powder was arranged in an intermediate region between the region in the q-axis direction and the region in the d-axis direction. Subsequently, the filled alloy powders were pressed at a press pressure of 1 t while a magnetic field of 1 T was being applied thereto to form a green compact.

The obtained green compact was subjected to sintering. In the sintering, the temperature of the green compact was raised up to a temperature of 1220° C. in the Ar atmosphere and held for 3 hours.

Next, the sintered compact was held at a temperature of 1180° C. for 20 hours in the Ar atmosphere and thereby subjected to a solution heat treatment, and then subjected to gas cooling down to room temperature.

Next, the sintered compact after the solution heat treatment was subjected to a heat treatment at a temperature of 700° C. for 1 hour in the Ar atmosphere, then subjected to a heat treatment at a temperature of 850° C. for 50 hours, subjected to slow cooling down to a temperature of 300° C. at a cooling rate of 0.4° C./min, and further cooled down to room temperature, as the aging treatment. Through the above processes, a sintered magnet was obtained.

Examples 5 to 8

Raw materials were weighed at a prescribed ratio and subjected to high-frequency melting to produce an alloy ingot. The alloy ingot was coarsely ground and then finely ground by a jet mill to prepare a first alloy powder having an average grain diameter of 4 µm. Further, a second alloy powder lower in Fe concentration than the first alloy powder and having an average grain diameter of 4 µm was similarly prepared.

In filling the obtained alloy powders into the metal mold, the first alloy powder and the second alloy powder were placed so that the first alloy powder was arranged in the region in the q-axis direction, the second alloy powder was arranged in the region in the d-axis direction, and a mixed powder of the first alloy powder and the second alloy powder was arranged in an intermediate region between the region in the q-axis direction and the region in the d-axis direction. A mixture ratio of the first alloy powder and the second alloy powder was adjusted so that the percentage of the second alloy powder increased from the region in the q-axis direction toward the region in the d-axis direction. Subsequently, the filled alloy powders were pressed at a press pressure of 1 t while a magnetic field of 1 T was being applied thereto to form a green compact.

The obtained green compact was subjected to sintering. In the sintering, the temperature of the green compact was raised up to a temperature of 1200° C. in the Ar atmosphere and held for 3 hours.

Next, the sintered compact was held at a temperature of 1180° C. for 12 hours in the Ar atmosphere and thereby subjected to a quality improvement heat treatment, then held at a temperature of 1160° C. for 12 hours and thereby subjected to a solution heat treatment, and then subjected to gas cooling down to room temperature.

Next, the sintered compact after the solution heat treatment was subjected to a heat treatment at a temperature of 700° C. for 1 hour in the Ar atmosphere, then subjected to a heat treatment at a temperature of 820° C. for 50 hours, subjected to slow cooling down to a temperature of 300° C. at a cooling rate of 0.2° C./min, and further cooled down to room temperature, as the aging treatment. Through the above processes, a sintered magnet was obtained.

Comparative Examples 1, 2

Raw materials were weighed at a prescribed ratio and subjected to high-frequency melting to produce an alloy ingot. The alloy ingot was coarsely ground and then finely ground by a jet mill to prepare an alloy powder having an average grain diameter of 4 μm. The obtained alloy powder was filled into the metal mold, and pressed at a press pressure of 1 t while a magnetic field of 1 T was being applied thereto to form a green compact.

The obtained green compact was subjected to heat treatments under the same conditions as those in Example 1 to obtain a sintered magnet.

Comparative Example 3

Raw materials were weighed at a prescribed ratio and subjected to high-frequency melting to produce an alloy ingot. The alloy ingot was coarsely ground and then finely ground by a jet mill to prepare a first alloy powder having an average grain diameter of 4 μm. Further, a second alloy powder lower in Fe concentration than the first alloy powder and having an average grain diameter of 4 μm was similarly prepared.

In filling the obtained alloy powders into the metal mold, the first alloy powder and the second alloy powder were placed so that the first alloy powder was arranged in the region the q-axis direction and the second alloy powder was arranged in the region in the d-axis direction. Subsequently, the filled alloy powders were pressed at a press pressure of 1 t while a magnetic field of 1 T was being applied thereto to form a green compact.

The obtained green compact was subjected to heat treatments under the same conditions as those in Example 1 to obtain a sintered magnet.

An average composition of the sintered magnet was measured for the sintered magnets in examples and comparative examples. Further, the value $r_1$ of $r_x$ at the q-axis direction center and the value $r_2$ of $r_x$ at the d-axis direction center were measured by the above method, and $r_1/r_2$ was determined. Further, the thermal demagnetization rate and the magnetic flux density when the sintered magnet was provided to the motor were evaluated. The results are listed in Table 1.

TABLE 1

| | Average magnet composition (at %) | $r_1/r_2$ | Thermal demagnetization | Magnetic flux density |
|---|---|---|---|---|
| Example 1 | $Sm_{11}Fe_{23}Zr_2Cu_5Co_{59}$ | 1.3 | ○ | ○ |
| Example 2 | $Sm_{11}Fe_{22}Zr_2Cu_5Co_{60}$ | 1.2 | ○ | ○ |
| Example 3 | $Sm_{11}Fe_{26}Zr_2Cu_5Co_{56}$ | 1.3 | ○ | ○ |
| Example 4 | $Sm_{11}Fe_{27}Zr_2Cu_5Co_{55}$ | 1.5 | ○ | ○ |
| Example 5 | $Sm_{11}Fe_{25}Zr_2Cu_5Co_{57}$ | 1.1 | ○ | ○ |
| Example 6 | $Sm_{11}Fe_{24}Zr_2Cu_5Co_{58}$ | 1.4 | ○ | ○ |
| Example 7 | $(Sm_{0.8}Pr_{0.1}Nd_{0.1})_{11}Fe_{25}Zr_2Cu_5Co_{57}$ | 1.2 | ○ | ○ |
| Example 8 | $Sm_{11}Fe_{25}(Zr_{0.8}Ti_{0.1}Hf_{0.1})_2Cu_5Co_{57}$ | 1.3 | ○ | ○ |
| Comparative example 1 | $Sm_{11}Fe_{27}Zr_2Cu_5Co_{55}$ | 1.0 | x | ○ |
| Comparative example 2 | $Sm_{11}Fe_{18}Zr_2Cu_5Co_{64}$ | 1.0 | ○ | x |
| Comparative example 3 | $Sm_{11}Fe_{27}Zr_2Cu_5Co_{55}$ | 0.7 | x | ○ |

In Table 1, the thermal demagnetization being "○ (Good)" means that the demagnetization region at 200° C. is 10% or less in the embodiment where the sintered magnet is provided to the motor, and the thermal demagnetization being "x (Bad)" means that the demagnetization region is more than 10%. In Table 1, the magnetic flux density being "○ (Good)" means that the residual magnetization of the magnet at 200° C. is 1.0 T or more, and the magnetic flux density being "x (Bad)" means that the residual magnetization is less than 1.0 T.

As is clear from Table 1, the value $r_x$ at the q-axis direction center of the sintered magnet in the examples is larger than the value $r_x$ at the d-axis direction center, so that the thermal demagnetization is prevented. Further, the magnetic flux density is also large. On the other hand, in the sintered magnets in Comparative example 1 and Comparative example 3, the value of $r_x$ at the q-axis direction center is equal to or smaller than the value of $r_x$ at the d-axis direction center, so that the thermal demagnetization is large. In the sintered magnet in Comparative example 2, the thermal demagnetization is prevented but the magnetic flux density is small.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

What is claimed is:

1. A permanent magnet to be provided to a rotary electric machine, the magnet being expressed by a composition formula: $R_p Fe_r M_s Cu_t Co_{100-p-r-s-t}$, where R is at least one element selected from the group consisting of rare earth elements, M is at least one element selected from the group consisting of Ti, Zr, and Hf, p is a number satisfying $10.5 \le p \le 12.5$ at %, r is a number satisfying $18 \le r \le 32$ at %, s is a number satisfying $0.88 \le s \le 4.5$ at %, and t is a number satisfying $0.88 \le t \le 13.5$ at %, wherein when a proportion $r_x$, of Fe to a total sum of Fe and Co is expressed by $r_x = r/(100-p-s-t)$, a value $r_1$ of the proportion $r_x$ at a center in a q-axis direction of the magnet and a value $r_2$ of the proportion $r_x$ at a center in d-axis direction of the magnet satisfy $1.01 \le r_1/r_2 \le 2$.

2. The magnet according to claim 1, wherein
50 at % or more of the R element in the composition formula is Sm.

3. The magnet according to claim 1, wherein
20 at % or less of Co in the composition formula is substituted with at least one element selected from the group consisting of Ni, V, Cr, Mn, Al, Ga, Nb, Ta, and W.

4. The magnet according to claim 1, wherein
50 at % or more of the M element in the composition formula is Zr.

5. The magnet according to claim 1, wherein
90 at % or more of the R element in the composition formula is Sm.

6. The magnet according to claim 1, wherein
the p is a number satisfying $11.0 \le p \le 11.6$ at %.

7. The magnet according to claim 1, wherein
the s is a number satisfying $1.3 \le s \le 2.0$ at %.

8. The magnet according to claim 1, wherein
when the magnet contains Hf, a content of Hf in the magnet is less than 20 at %.

9. A rotary electric machine comprising:
a stator; and
a rotor, wherein
the stator or the rotor has the magnet according to claim 1.

10. The rotary electric machine according to claim 9, being a surface magnet rotary electric machine.

11. The rotary electric machine according to claim 9, further comprising a cooling fin.

12. The rotary electric machine according to claim 9, wherein
the rotor is connected to a turbine via a shaft.

13. A vehicle comprising the rotary electric machine according to claim 9.

14. The vehicle according to claim 13, wherein:
the rotor is connected to a shaft; and
rotation is transmitted to the shaft.

15. An aircraft comprising the rotary electric machine according to claim 9.

* * * * *